US011970001B2

(12) United States Patent
Toyofuku et al.

(10) Patent No.: US 11,970,001 B2
(45) Date of Patent: Apr. 30, 2024

(54) DRIVING WAVEFORM DETERMINING METHOD, NON-TRANSITORY COMPUTER-READABLE STORAGE MEDIUM STORING DRIVING WAVEFORM DETERMINING PROGRAM, LIQUID EJECTING APPARATUS, AND DRIVING WAVEFORM DETERMINING SYSTEM

(71) Applicant: SEIKO EPSON CORPORATION, Tokyo (JP)

(72) Inventors: Atsushi Toyofuku, Shiojiri (JP); Toshiro Murayama, Fujimi-machi (JP); Takahiro Katakura, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 17/443,594

(22) Filed: Jul. 27, 2021

(65) Prior Publication Data

US 2022/0032616 A1 Feb. 3, 2022

(30) Foreign Application Priority Data

Jul. 30, 2020 (JP) ................................ 2020-129067

(51) Int. Cl.
*B41J 2/045* (2006.01)
*B41J 2/14* (2006.01)

(52) U.S. Cl.
CPC ......... *B41J 2/04588* (2013.01); *B41J 2/0452* (2013.01); *B41J 2/04541* (2013.01); *B41J 2/04581* (2013.01)

(58) Field of Classification Search
CPC .................................................... B41J 2/04588
See application file for complete search history.

(56) References Cited

U.S. PATENT DOCUMENTS

2004/0189732 A1* 9/2004 Usuda .................... B41J 2/0456 347/19
2007/0057979 A1* 3/2007 Gardner ............... B41J 2/04561 347/5
2007/0076040 A1* 4/2007 Shang .................... B41J 3/4073 347/19

(Continued)

FOREIGN PATENT DOCUMENTS

JP 2005186397 A * 7/2005
JP 2010-131910 A 6/2010
JP 2018-144346 A 9/2018

OTHER PUBLICATIONS

Machine generated English translation of JP2005186397A to Nakanishi, "Inkjet Recording Device"; translation retrieved from FIT database on Jun. 16, 2023; 16pp. (Year: 2023).*

*Primary Examiner* — Shelby L Fidler
(74) *Attorney, Agent, or Firm* — WORKMAN NYDEGGER

(57) ABSTRACT

A driving waveform determining method with which a waveform of a driving pulse applied to a driving element provided in a liquid ejecting head that ejects a liquid is determined includes: a first step of determining a waveform candidate of the driving pulse; a second step of notifying a user of candidate information of the waveform candidate; a third step of receiving an instruction issued by the user in accordance with the candidate information; and a fourth step of determining the waveform of the driving pulse in accordance with the instruction.

17 Claims, 7 Drawing Sheets

(56) References Cited

U.S. PATENT DOCUMENTS

| | | | | |
|---|---|---|---|---|
| 2008/0266339 | A1* | 10/2008 | Snyder | B41J 2/2128 347/12 |
| 2017/0259560 | A1* | 9/2017 | Sreenivasan | B41J 2/04581 |
| 2018/0086081 | A1* | 3/2018 | Sakamoto | B41J 2/16526 |
| 2018/0250931 | A1* | 9/2018 | Sakamoto | B41J 2/14233 |

* cited by examiner

DRIVING WAVEFORM DETERMINING METHOD, NON-TRANSITORY COMPUTER-READABLE STORAGE MEDIUM STORING DRIVING WAVEFORM DETERMINING PROGRAM, LIQUID EJECTING APPARATUS, AND DRIVING WAVEFORM DETERMINING SYSTEM

The present application is based on, and claims priority from JP Application Serial Number 2020-129067, filed Jul. 30, 2020, the disclosure of which is hereby incorporated by reference herein in its entirety.

BACKGROUND

1. Technical Field

The present disclosure relates to a driving waveform determining method, a non-transitory computer-readable storage medium storing a driving waveform determining program, a liquid ejecting apparatus, and a driving waveform determining system.

2. Related Art

In typical liquid ejecting apparatuses such as ink jet printers, liquid such as ink is ejected from a nozzle when a driving pulse is applied to a driving element such as a piezoelectric element. Here, a waveform of the driving pulse is determined so as to achieve desired ejection characteristics of the ink ejected from the nozzle.

According to the technique described in JP-A-2010-131910, a parameter for determining a driving waveform that is a waveform of a driving pulse is changed multiple times to measure ejection characteristics, and, in accordance with the measurement result, the parameter of a driving waveform that is actually used is determined.

According to the technique described in JP-A-2010-131910, since a user manually determines the driving waveform, there is a problem of an excessive burden on the user. In view of this problem, automating determination of the driving waveform through simulation or automated measurement is considered for reducing the burden on the user.

However, in the case of simply automating determination of the driving waveform, even when the user has knowledge regarding determination of the driving waveform, it is difficult for the determination to be performed based on the knowledge, resulting in a possibility of an excessive increase in the number of simulations or actual measurements performed. When the number increases excessively, a long time is required to determine the driving waveform, or the amount of ink consumed in actual measurement increases, neither of which is desirable from the viewpoint of time and cost.

SUMMARY

To address the aforementioned problem, an aspect of a driving waveform determining method according to the disclosure is a driving waveform determining method with which a waveform of a driving pulse applied to a driving element provided in a liquid ejecting head that ejects a liquid is determined, and the driving waveform determining method includes: a first step of determining a waveform candidate of the driving pulse; a second step of notifying a user of candidate information of the waveform candidate; a third step of receiving an instruction issued by the user in accordance with the candidate information; and a fourth step of determining the waveform of the driving pulse in accordance with the instruction.

An aspect of a non-transitory computer-readable storage medium storing a driving waveform determining program of the disclosure causes a computer to execute the driving waveform determining method according to the aspect described above.

An aspect of a liquid ejecting apparatus of the disclosure includes: a liquid ejecting head that has a driving element for ejecting a liquid; and a processing circuit that performs processing of determining a waveform of a driving pulse applied to the driving element, in which the processing circuit performs a first step of determining a waveform candidate of the driving pulse; a second step of notifying a user of candidate information of the waveform candidate; a third step of receiving an instruction issued by the user in accordance with the candidate information; and a fourth step of determining the waveform of the driving pulse in accordance with the instruction.

An aspect of a driving waveform determining system of the disclosure includes: a liquid ejecting head that has a driving element for ejecting a liquid; and a processing circuit that performs processing of determining a waveform of a driving pulse applied to the driving element, in which the processing circuit performs a first step of determining a waveform candidate of the driving pulse; a second step of notifying a user of candidate information of the waveform candidate; a third step of receiving an instruction issued by the user in accordance with the candidate information; and a fourth step of determining the waveform of the driving pulse in accordance with the instruction.

DESCRIPTION OF EXEMPLARY EMBODIMENTS

Figure 1:
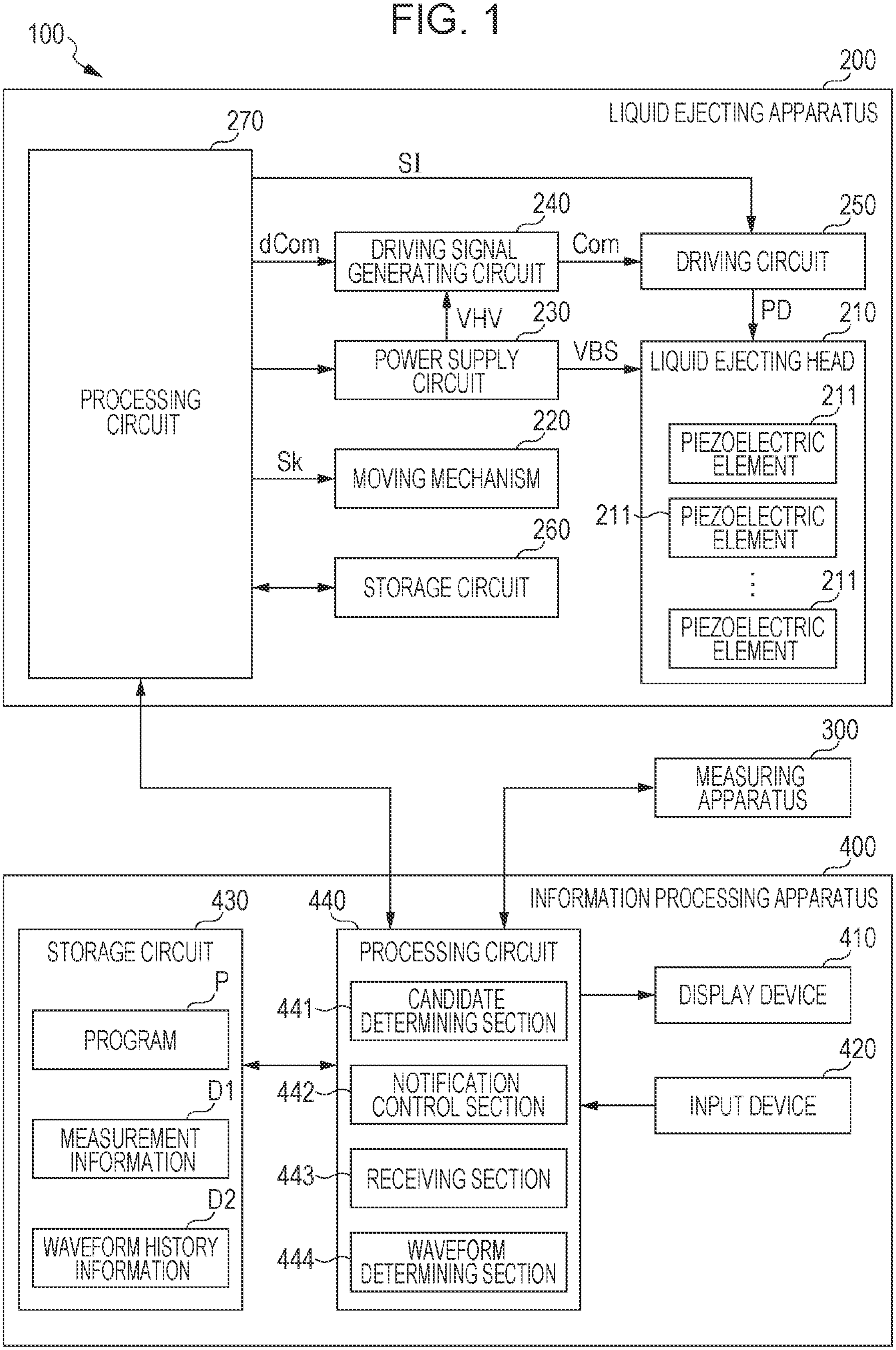
FIG. 1 is a schematic view illustrating an example of a configuration of a driving waveform determining system according to a first embodiment.

Suitable embodiments according to the disclosure will be described below with reference to the accompanying drawings. Note that, in the drawings, dimensions or scales of sections appropriately differ from actual ones, and some sections are schematically illustrated for easy understanding. The scope of the disclosure is not limited to the embodiments as long as there is no description particularly limiting the disclosure in the following description.

1. First Embodiment

1-1. Outline of Driving Waveform Determining System 100

FIG. 1 is a schematic view illustrating an example of a configuration of a driving waveform determining system 100 according to a first embodiment. The driving waveform determining system 100 determines a waveform of a driving pulse PD that is used when ink, which is an example of a liquid, is ejected. More specifically, the driving waveform determining system 100 notifies a user of one or more waveform candidates of the driving pulse by appropriately using the result obtained by measuring ejection characteristics of the ink and determines a waveform of the driving pulse in accordance with a user instruction.

As illustrated in FIG. 1, the driving waveform determining system 100 includes a liquid ejecting apparatus 200, a measuring apparatus 300, and an information processing apparatus 400, which is an example of a computer. Hereinafter, these will be described sequentially with reference to FIG. 1.

1-1a. Liquid Ejecting Apparatus 200

The liquid ejecting apparatus 200 is a printer that performs printing on a printing medium by using an ink jet method. The printing medium is not particularly limited as long as it is a medium on which the liquid ejecting apparatus 200 is able to perform printing, and examples thereof include various sheets, various fabric, and various films. Note that the liquid ejecting apparatus 200 may be a printer of a serial type or a line type.

As illustrated in FIG. 1, the liquid ejecting apparatus 200 includes a liquid ejecting head 210, a moving mechanism 220, a power supply circuit 230, a driving signal generating circuit 240, a driving circuit 250, a storage circuit 260, and a processing circuit 270.

The liquid ejecting head 210 ejects the ink onto the printing medium. In FIG. 1, a plurality of piezoelectric elements 211, each of which is an example of a driving element, are illustrated as components of the liquid ejecting head 210. Although not illustrated, the liquid ejecting head 210 includes, in addition to the piezoelectric elements 211, cavities in which the ink is stored and nozzles that communicate with the cavities. Here, a piezoelectric element 211 is provided for each of the cavities, and when pressure of the cavity changes, the ink is ejected from a nozzle corresponding to the cavity. Note that, instead of the piezoelectric element 211, a heater that heats the ink in the cavity may be used as the driving element.

The number of liquid ejecting heads 210 of the liquid ejecting apparatus 200 is one in the example illustrated in FIG. 1 but may be two or more. In such an instance, for example, two or more liquid ejecting heads 210 are unitized. When the liquid ejecting apparatus 200 is a serial type, the liquid ejecting head 210 or a unit that includes two or more liquid ejecting heads 210 is used such that a plurality of nozzles are distributed over a portion of the printing medium in a width direction. When the liquid ejecting apparatus 200 is a line type, a unit that includes two or more liquid ejecting heads 210 is used such that a plurality of nozzles are distributed over the entire region of the printing medium in the width direction.

The moving mechanism 220 changes relative positions of the liquid ejecting head 210 and the printing medium. More specifically, when the liquid ejecting apparatus 200 is a serial type, the moving mechanism 220 includes a transport mechanism that transports the printing medium in a given direction and a moving mechanism that iteratively moves the liquid ejecting head 210 in an axial direction orthogonal to the transport direction of the printing medium. When the liquid ejecting apparatus 200 is a line type, the moving mechanism 220 includes a transport mechanism that transports the printing medium in a direction intersecting a longitudinal direction of the unit that includes two or more liquid ejecting heads 210.

Upon receiving supply of power from a commercial power source (not illustrated), the power supply circuit 230 generates various predetermined potentials. The various potentials that are generated are supplied appropriately to the respective sections of the liquid ejecting apparatus 200. For example, the power supply circuit 230 generates a power supply potential VHV and an offset potential VBS. The offset potential VBS is supplied to the liquid ejecting head 210 and the like. The power supply potential VHV is supplied to the driving signal generating circuit 240 and the like.

The driving signal generating circuit 240 is a circuit that generates a driving signal Com for driving the respective piezoelectric elements 211 of the liquid ejecting head 210. Specifically, the driving signal generating circuit 240 includes, for example, a digital-to-analog conversion circuit and an amplification circuit. In the driving signal generating circuit 240, the digital-to-analog conversion circuit converts a waveform specification signal dCom supplied from the processing circuit 270, which will be described later, from a digital signal into an analog signal, and the amplification circuit amplifies the analog signal by using the power supply potential VHV from the power supply circuit 230, thereby generating the driving signal Com. Here, of the waveforms included in the driving signal Com, the signal of the waveform actually supplied to the piezoelectric element 211 is the driving pulse PD. Note that the driving pulse PD will be specifically described later.

The driving circuit 250 switches between supplying and not supplying, as the driving pulse PD, at least some of the waveforms included in the driving signal Com to each of the plurality of piezoelectric elements 211 in accordance with a control signal SI described later. The driving circuit 250 is an IC (integrated circuit) chip that outputs the driving signal for driving each of the piezoelectric elements 211 and a reference voltage.

The storage circuit 260 stores various programs executed by the processing circuit 270 and various kinds of data such as print data Img processed by the processing circuit 270. The storage circuit 260 includes semiconductor memory of, for example, one or both of volatile memory such as RAM (random access memory) and non-volatile memory such as ROM (read-only memory), EEPROM (electrically erasable programmable read-only memory), or PROM (programmable ROM). The print data Img is supplied from, for example, the information processing apparatus 400. Note that the storage circuit 260 may be constituted by a portion of the processing circuit 270.

The processing circuit 270 has a function of controlling the operation of the respective sections of the liquid ejecting apparatus 200 and a function of processing various kinds of data. The processing circuit 270 includes, for example, one or more processors such as a CPU (central processing unit). Note that the processing circuit 270 may include a programmable logic device such as an FPGA (field-programmable gate array) instead of or in addition to a CPU.

The processing circuit 270 controls the operation of the respective sections of the liquid ejecting apparatus 200 by executing a program stored in the storage circuit 260. Here, the processing circuit 270 generates signals such as control signals Sk and SI and the waveform specification signal dCom as signals for controlling the operation of the respective sections of the liquid ejecting apparatus 200.

The control signal Sk is a signal for controlling driving of the moving mechanism 220. The control signal SI is a signal for controlling driving of the driving circuit 250. Specifically, the control signal SI is used to specify, per predetermined unit period, whether or not the driving circuit 250 supplies, to the liquid ejecting head 210, the driving signal Com supplied from the driving signal generating circuit 240 as the driving pulse PD. Such a specification enables, for example, the amount of the ink ejected from the liquid ejecting head 210 to be specified. The waveform specification signal dCom is a digital signal for defining a waveform of the driving signal Com generated by the driving signal generating circuit 240.

1-1b. Measuring Apparatus 300

The measuring apparatus 300 is an apparatus that measures ejection characteristics of the ink ejected from the liquid ejecting head 210 when the driving pulse PD is actually used. Examples of the ejection characteristics include the ejection velocity, the amount of the ink, the number of satellites, and stability. Among these, for example, the ejection velocity and the amount of the ink are used as the ejection characteristics in the present embodiment.

The measuring apparatus 300 of the present embodiment is an imaging apparatus for imaging in-flight ink ejected from the liquid ejecting head 210. Specifically, the measuring apparatus 300 includes, for example, an imaging optical system and an imaging element. The imaging optical system is an optical system including at least one imaging lens and may include various optical elements, such as a prism, or may include a zoom lens, a focusing lens, or the like. The imaging element is, for example, a CCD (charge coupled device) image sensor or a CMOS (complementary MOS) image sensor. Measurement of ejection characteristics performed by the measuring apparatus 300 by using a captured image will be specifically described later.

Note that, in the present embodiment, although the measuring apparatus 300 images in-flight ink, the measuring apparatus 300 is also able to measure the ejection characteristics such as the amount of the ink ejected from the liquid ejecting head 210 in accordance with the result obtained by imaging the ink deposited on the printing medium or the like. The measuring apparatus 300 is not limited to an imaging apparatus as long as the apparatus is able to obtain the measurement result according to the ejection characteristics of the ink ejected from the liquid ejecting head 210, and the measuring apparatus 300 may be, for example, an electronic balance that measures the mass of the ink ejected from the liquid ejecting head 210. Further, as a source of information for measuring the ejection characteristics of the ink ejected from the liquid ejecting head 210, in addition to information from the measuring apparatus 300, the result obtained by detecting a waveform of residual vibration generated by the liquid ejecting head 210 may be used. The residual vibration is vibration remaining in an ink channel of the liquid ejecting head 210 after driving of the piezoelectric element 211 and is detected as, for example, a voltage signal from the piezoelectric element 211.

1-1c. Information Processing Apparatus 400

The information processing apparatus 400 is a computer that controls the operation of the liquid ejecting apparatus 200 and the measuring apparatus 300. Here, the information processing apparatus 400 is coupled to each of the liquid ejecting apparatus 200 and the measuring apparatus 300 so as to enable wireless or wired communication. Note that such coupling may be performed via a communication network, including the Internet.

The information processing apparatus 400 of the present embodiment is an example of a computer that executes a program P, which is an example of a driving waveform determining program. The program P causes the information processing apparatus 400 to execute a driving waveform determining method for determining the waveform of the driving pulse PD applied to the piezoelectric element 211 provided in the liquid ejecting head 210 that ejects the ink, which is an example of the liquid.

As illustrated in FIG. 1, the information processing apparatus 400 includes a display device 410, which is an example of a display section, an input device 420, a storage circuit 430, and a processing circuit 440. These are coupled to each other so as to enable communication.

The display device 410 displays various images in accordance with control of the processing circuit 440. Here, the display device 410 may include various display panels, such as a liquid crystal display panel and an organic EL (electroluminescence) display panel. Note that the display device 410 may be provided outside the information processing apparatus 400 or may be a component of the liquid ejecting apparatus 200.

The input device 420 is a device that receives a user operation. For example, the input device 420 includes a pointing device, such as a touch pad, a touch panel, or a mouse. Here, when the input device 420 includes a touch panel, the input device 420 may also function as the display device 410. Note that the input device 420 may be provided outside the information processing apparatus 400 or may be a component of the liquid ejecting apparatus 200.

The storage circuit 430 is a device that stores various programs executed by the processing circuit 440 and various kinds of data processed by the processing circuit 440. The storage circuit 430 includes, for example, a hard disc drive or semiconductor memory. Note that a portion of the storage circuit 430 or the whole storage circuit 430 may be provided in a storage apparatus, a server, or the like disposed outside the information processing apparatus 400.

The program P, measurement information D1, and waveform history information D2 are stored in the storage circuit 430 of the present embodiment. The measurement information D1 is information indicating the measurement result of the measuring apparatus 300 described above. The waveform history information D2 indicates various kinds of information used for determining the driving pulse PD waveform and is, for example, information indicating a relationship between the driving pulse PD waveform and the ejection characteristics of the ink ejected from the liquid ejecting head 210. Note that some or all of the program P, the measurement information D1, and the waveform history information D2 may be stored in a storage apparatus, a server, or the like disposed outside the information processing apparatus 400.

The processing circuit 440 is a device having a function of controlling the respective sections of the information processing apparatus 400, the liquid ejecting apparatus 200, and the measuring apparatus 300 and having a function of processing various kinds of data. The processing circuit 440 includes a processor such as a CPU (central processing unit). Note that the processing circuit 440 may be constituted by a single processor or a plurality of processors. Moreover, some or all of the functions of the processing circuit 440 may be realized by hardware such as a DSP (digital signal processor), an ASIC (application specific integrated circuit), a PLD (programmable logic device), or an FPGA (field programmable gate array).

The processing circuit 440 functions as a candidate determining section 441, a notification control section 442, a receiving section 443, and a waveform determining section 444 by reading and executing the program P stored in the storage circuit 430.

The candidate determining section 441 is a functional section for performing a first step and determines a waveform candidate of the driving pulse PD. The waveform candidate is an example of a waveform that is searched for when the user determines the driving pulse PD waveform, and examples thereof include waveform candidates SC_1, SC_2, and SC_3 illustrated in FIG. 6 described later. The notification control section 442 is a functional section for performing a second step and notifies the user of candidate information of the waveform candidate. A notification is not particularly limited as long as the user is able to be notified of the candidate content, and in the present embodiment, the notification is displayed on the display device 410 described above. Examples of the candidate information include candidate information R_1, R_2, and R_3 illustrated in FIG. 5 described later. The receiving section 443 is a functional section for performing a third step and receives, via the aforementioned input device 420 or the like, an instruction issued by the user in accordance with the candidate information. The waveform determining section 444 is a functional section for performing a fourth step and determines the driving pulse PD waveform in accordance with the instruction.

1-2. Example of Driving Pulse PD Waveform

Figure 2:
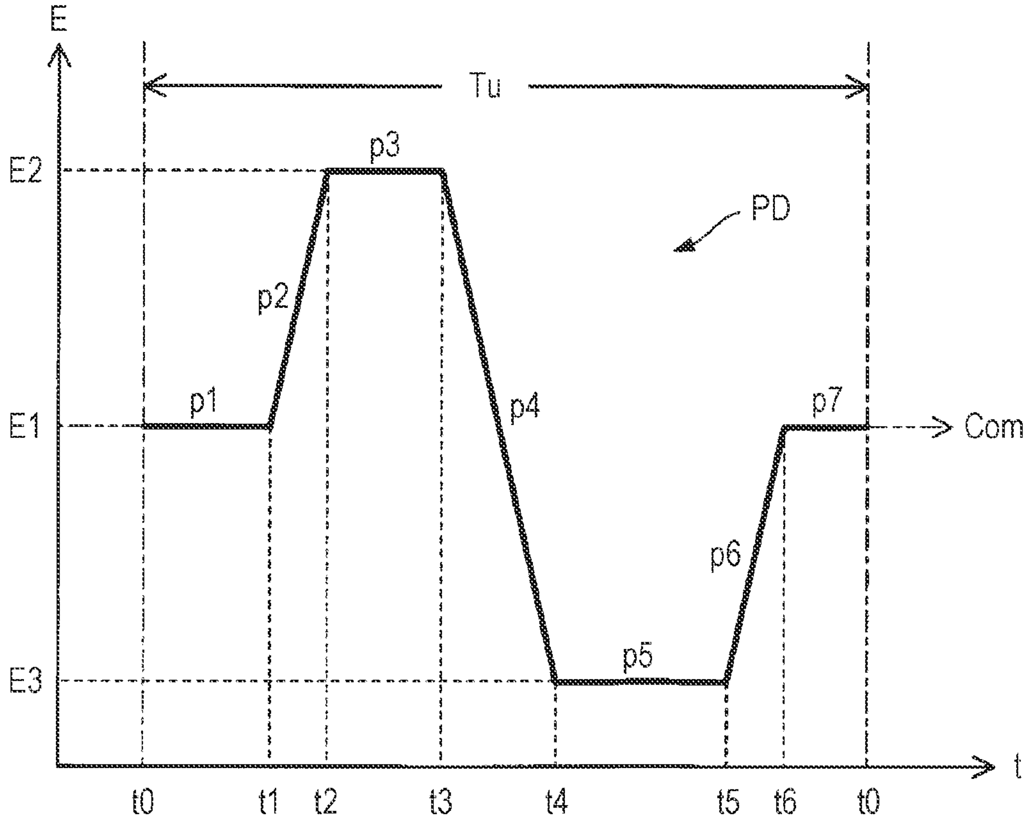
FIG. 2 illustrates an example of a driving pulse waveform.

FIG. 2 illustrates an example of the driving pulse PD waveform. FIG. 2 illustrates a change over time in potential of the driving pulse PD, that is, a voltage waveform of the driving pulse PD. Note that the driving pulse PD waveform is not limited to the example illustrated in FIG. 2 and may be any waveform.

As illustrated in FIG. 2, the driving pulse PD is included in the driving signal Com per unit period Tu. A potential E of the driving pulse PD rises from a reference potential E1 to a potential E2, then drops to a potential E3 lower than the potential E1, and then returns to the potential E1.

More specifically, the potential E of the driving pulse PD is first kept at the potential E1 during a period from a timing t0 to a timing t1 and then rises to the potential E2 during a period from the timing t1 to a timing t2. The potential E of the driving pulse PD is kept at the potential E2 during a period from the timing t2 to a timing t3 and then drops to the potential E3 during a period from the timing t3 to a timing t4. Next, the potential E is kept at the potential E3 during a period from the timing t4 to a timing t5 and then rises to the potential E1 during a period from the timing t5 to a timing t6.

The driving pulse PD having such a waveform increases the capacity of a pressure chamber of the liquid ejecting head 210 during the period from the timing t1 to the timing t2 and sharply reduces the capacity of the pressure chamber during the period from the timing t3 to the timing t4. Such a change in the capacity of the pressure chamber enables some of the ink in the pressure chamber to be ejected from the nozzle as liquid droplets.

The driving pulse PD waveform as described above is able to be represented by a function that uses parameters p1, p2, p3, p4, p5, p6, and p7 corresponding to the respective periods described above. When the driving pulse PD waveform is defined by the function, by changing the respective parameters, it is possible to adjust the driving pulse PD waveform. By adjusting the driving pulse PD waveform, it is possible to adjust the ejection characteristics of the ink ejected from the liquid ejecting head 210.

1-3. Measurement of Ejection Characteristics of Ink

Figure 3:
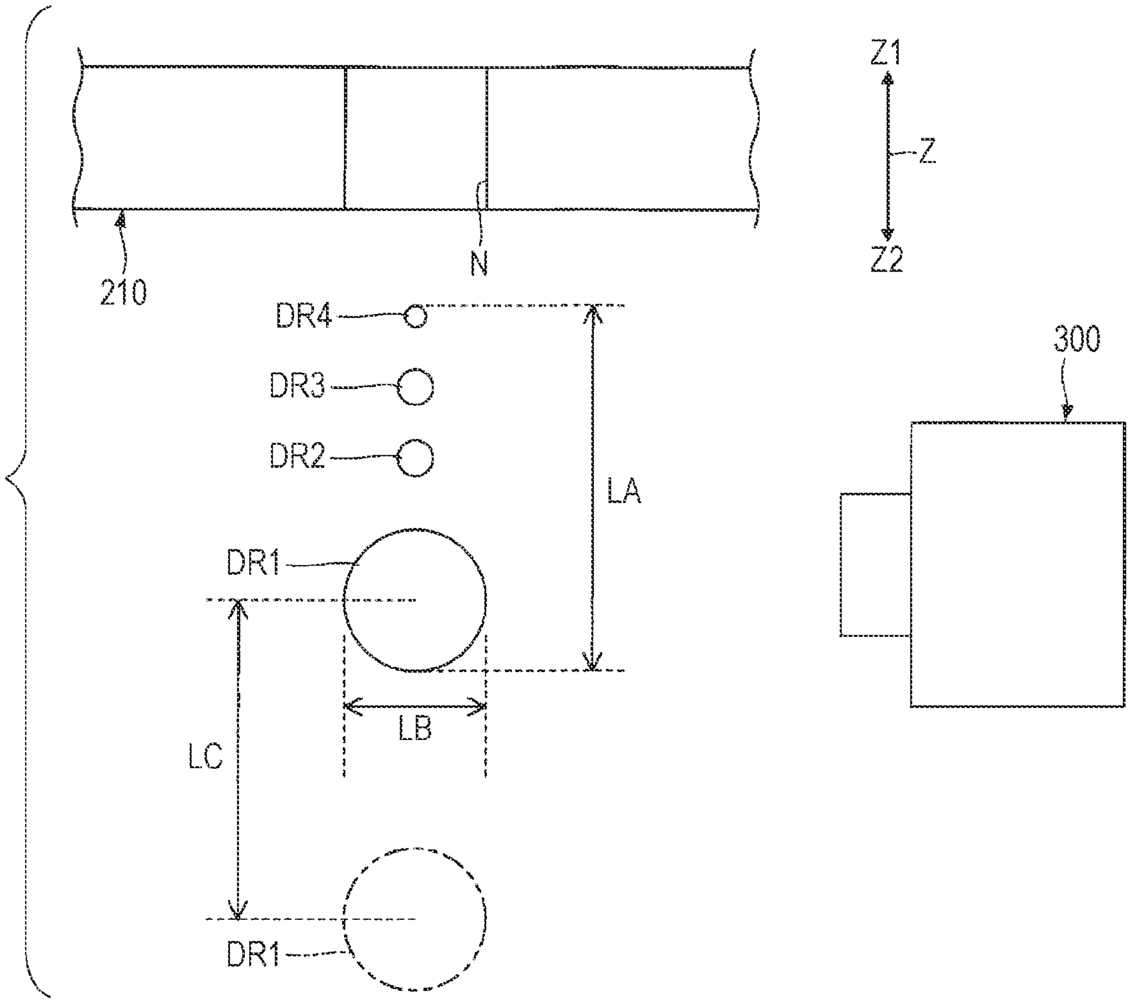
FIG. 3 is a view for explaining measurement of ejection characteristics of ink.

FIG. 3 is a view for explaining measurement of the ejection characteristics of the ink. As illustrated in FIG. 3, the measuring apparatus 300 of the present embodiment images, in a direction orthogonal to or intersecting an ejection direction, liquid droplets DR1, DR2, DR3, and DR4 of the in-flight ink ejected from a nozzle N of the liquid ejecting head 210.

The liquid droplet DR1 is a main liquid droplet. On the other hand, the respective liquid droplets DR2, DR3, and DR4 are liquid droplets called satellites, a diameter of which is smaller than that of the liquid droplet DR1. Note that the presence or absence of the liquid droplets DR2, DR3, and DR4, and the number, size, and the like of the liquid droplets DR2, DR3, and DR4 vary depending on the driving pulse PD waveform described above.

The ejection amount of the ink ejected from the liquid ejecting head 210 is calculated in accordance with a diameter LB of the liquid droplet DR1 by using, for example, an image captured by the measuring apparatus 300. For example, by continuously imaging the liquid droplet DR1, the ejection velocity of the ink ejected from the liquid ejecting head 210 is calculated in accordance with a distance LC, by which the liquid droplet DR1 moves in a predetermined time, and in accordance with the predetermined time. In FIG. 3, the liquid droplet DR1 after the predetermined time has elapsed is indicated by the two-dot chain line. Moreover, an aspect ratio (LA/LB) of the ink ejected from the liquid ejecting head 210 is also able to be calculated as the ejection characteristics of the ink.

1-4. Flow of Determining Driving Pulse PD Waveform

In the driving waveform determining system 100, first, one or more initial waveforms are set to determine the driving pulse PD waveform. The initial waveforms are set when the user performs an input operation via the input device 420 described above or are automatically set when the program P is executed.

Figure 4:
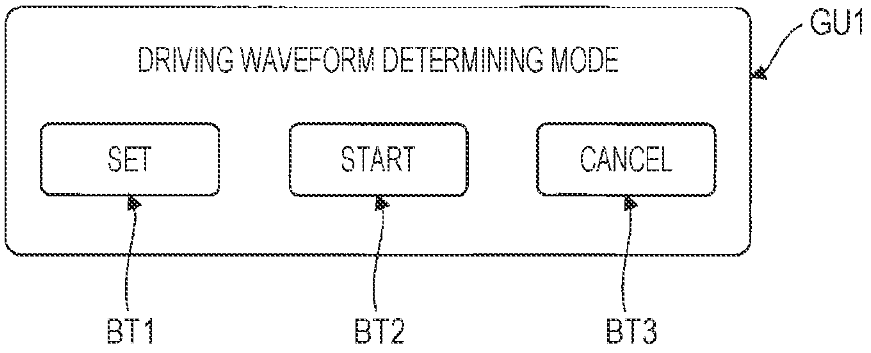
FIG. 4 illustrates an example of an image displayed for starting a driving waveform determining mode.

FIG. 4 illustrates an example of an image displayed for starting a driving waveform determining mode. When the program P is executed, the information processing apparatus 400 shifts to the driving waveform determining mode, and, for example, an image GU1 for a GUI (graphical user interface) illustrated in FIG. 4 is displayed on the display device 410. The image GUI includes buttons BT1, BT2, and BT3 for receiving an instruction from the user.

The button BT1 is a button for various settings of the driving waveform determining mode. When the button BT1 is operated, the information processing apparatus 400 causes the display device 410 to display a GUI image (not illustrated) that includes items and the like for various settings of the driving waveform determining mode. By using the GUI image, an initial waveform is input by the user via, for example, the input device 420.

The button BT2 is a button for starting processing of determining the driving pulse PD waveform. Operating the button BT2 starts processing of determining the driving pulse PD waveform. The button BT3 is a button for cancelling the driving waveform determining mode. Operating the button BT3 ends display of the image GU1 and cancels the driving waveform determining mode.

Figure 6:
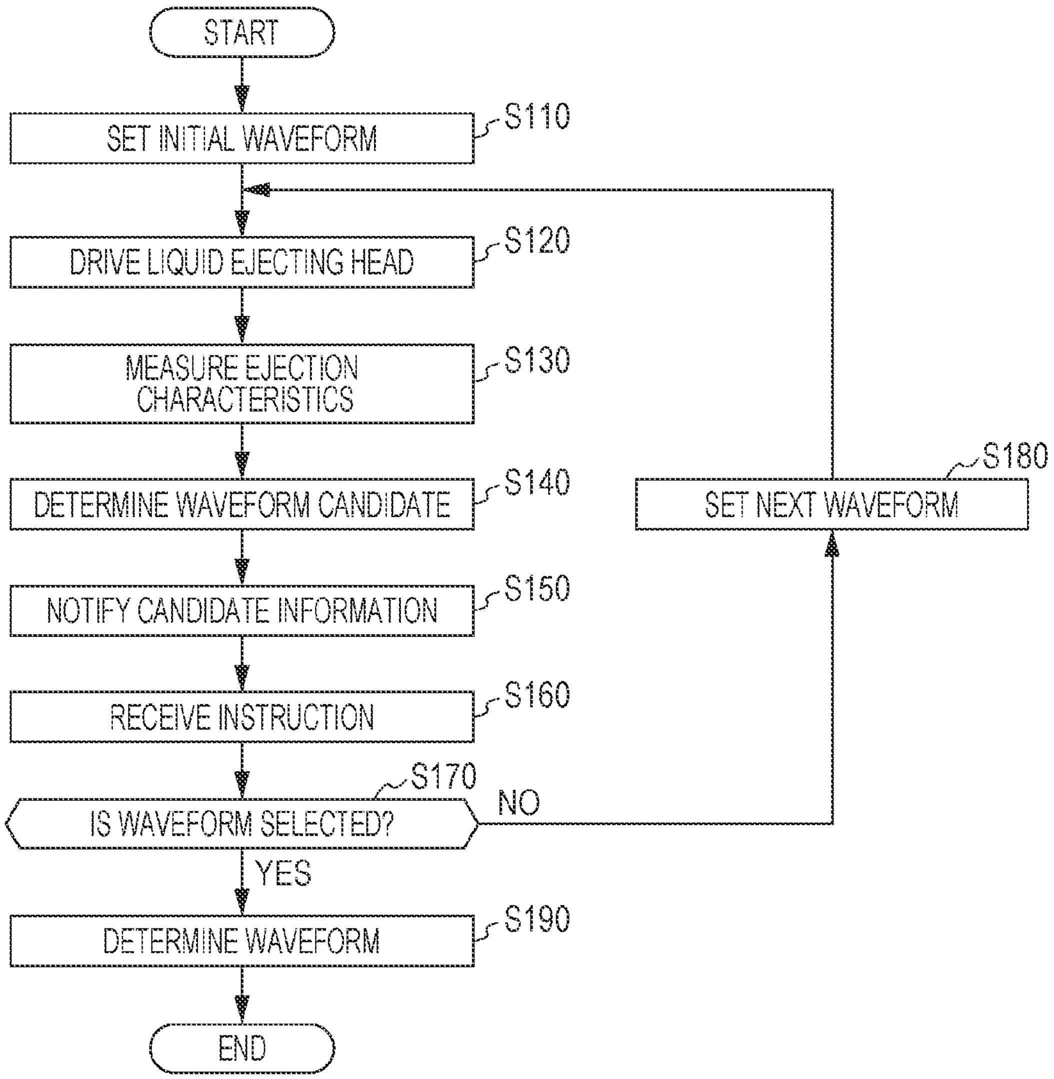
FIG. 6 is a flowchart of a driving waveform determining method according to the first embodiment.

FIG. 6 is a flowchart of the driving waveform determining method according to the first embodiment. First, in step S110, the candidate determining section 441 sets an initial waveform. Although the initial waveform may be determined in any manner, for example, a waveform stored in advance in the storage circuit 430, a waveform directly input by the user via the input device 420, or a waveform determined randomly by the processing circuit 440 may be used.

Next, in step S120, the candidate determining section 441 drives the liquid ejecting head 210 by using the initial waveform for the driving pulse PD. In step S130, the candidate determining section 441 measures the ejection characteristics of the ink ejected from the liquid ejecting head 210 by using the measuring apparatus 300 as described above.

In step S140, the candidate determining section 441 then determines waveform candidates SC_1, SC_2, and SC_3 by using the measurement result of the measuring apparatus 300. Next, processing in step S140 will be described.

The waveform candidates SC_1, SC_2, and SC_3 are determined in accordance with the result from the measuring apparatus 300 measuring the ejection characteristics when the ink is ejected from the liquid ejecting head 210 by using the aforementioned initial waveform for the driving pulse PD. Such determination is performed by using an evaluation function that takes a minimum or maximum value when predetermined ejection characteristics have a desired value or range. For example, in a case in which an evaluation function that takes a minimum value when predetermined ejection characteristics have a desired value or range is used, the waveform candidates SC_1, SC_2, and SC_3 are determined by Bayesian optimization or the Nelder-Mead method with which an evaluation value of the evaluation function according to the measured ejection characteristics is minimized. A linear sum of terms regarding the predetermined ejection characteristics is used for the evaluation function. A linear sum of a term regarding the ejection velocity and a term regarding the amount of the ink is used for the evaluation function of the present embodiment. Moreover, parameters of the evaluation function are the parameters p1, p2, p3, and pn regarding the driving pulse PD waveform described above.

More specifically, an example of the evaluation function f(x) is represented by $$f(x)=W1\times(Vm(x)-Vm\text{target})^2+W2\times(Iw(x)-Iw\text{target})^2.$$

Here, in the evaluation function f(x), x is the parameter p1, p2, p3, or pn. Vm(x) is a measurement value of the ejection velocity. Iw(x) is a measurement value of the amount of the ink. Vmtarget is a target value of the ejection velocity. Iwtarget is a target value of the amount of the ink. W1 and W2 are each a weighting coefficient. Note that, as the example of the evaluation function f(x), evaluation is performed by using the amount of the ink and the ejection velocity but may be performed by using ejection stability, inclination in the ejection direction, and other items.

When Bayesian optimization is used to determine the waveform candidates SC_1, SC_2, and SC_3, by using an acquisition function such as EI (expected improvement), PI (probability of improvement), UCB (upper confidence bound), or PES (predictive entropy search) and searching for the parameters p1, p2, p3, and pn, the waveform candidates SC_1, SC_2, and SC_3 are determined as the waveform candidates (Xn).

Here, features of the obtained waveform candidates SC_1, SC_2, and SC_3 vary depending on the type of the acquisition function used. In general, the waveform candidates SC_1, SC_2, and SC_3 obtained by using the acquisition function EI tend to be waveforms for which an expected value of an improvement amount is high. The waveform candidates SC_1, SC_2, and SC_3 obtained by using the acquisition function PI are waveforms for which a probability of improvement is high but an improvement amount is small. The waveform candidates SC_1, SC_2, and SC_3 obtained by using the acquisition function UCB are waveforms that enable not only great improvement but also great deterioration.

When the Nelder-Mead method is used to determine the waveform candidates SC_1, SC_2, and SC_3, the waveform candidates SC_1, SC_2, and SC_3 are determined as solutions resulting from reflection, expansion, and contraction of the Nelder-Mead method. Here, by changing a reflection coefficient of reflection, an expansion coefficient of expansion, and a contraction coefficient of contraction, a plurality of waveform candidates are able to be determined by reflection, expansion, and contraction. The Nelder-Mead method is a local optimization algorithm and is thus suitably used to slightly change an ink property or target ejection characteristics by using an existing waveform for the driving pulse PD.

Note that, here, the waveform candidates SC_1, SC_2, and SC_3 are determined by using the evaluation function f(x) in step S140 but are not necessarily required to be determined in such a manner. For example, the waveform candidates SC_1, SC_2, and SC_3 may be determined by excluding, from the initial waveforms, a waveform that differs significantly from an ideal waveform. Moreover, only the waveform candidates SC_1, SC_2, and SC_3 may be set as the initial waveforms, and these may be directly determined as the waveform candidates SC_1, SC_2, and SC_3 in subsequent steps.

Next, in step S150, the notification control section 442 generates candidate information R_1, R_2, and R_3 as described later in accordance with the waveform candidates SC_1, SC_2, and SC_3 and causes the display device 410 to display the candidate information R_1, R_2, and R_3.

Next, in step S160, a user instruction for the user to select or modify the waveform candidates SC_1, SC_2, and SC_3 via the input device 420 is received as described later.

Next, in step S170, the waveform determining section 444 determines whether or not one of the waveform candidates SC_1, SC_2, and SC_3 is selected.

When none of the waveform candidates SC_1, SC_2, and SC_3 are selected, the procedure proceeds to step S180 in which the next waveform to be subsequently applied is determined. The next waveform may be determined in any manner in step S180 but is desirably a waveform that differs from the waveform candidates SC_1, SC_2, and SC_3 not selected in accordance with the user instruction. For example, a waveform other than the waveform candidates SC_1, SC_2, and SC_3 may be used, and, for example, a waveform stored in advance in the storage circuit 430, a waveform input directly by the user via the input device 420, or a waveform determined randomly by the processing circuit 440 may be used. The procedure then returns to step S120 described above, and the liquid ejecting head is driven with the next waveform. Next, the respective steps described above are similarly performed.

On the other hand, when one of the waveform candidates SC_1, SC_2, and SC_3 is selected, the procedure proceeds to step S190 in which the waveform determining section 444 determines the selected waveform candidate as the driving pulse PD waveform, and the procedure then ends.

1-5. Details of GUI for Receiving User Instruction

Figure 5:
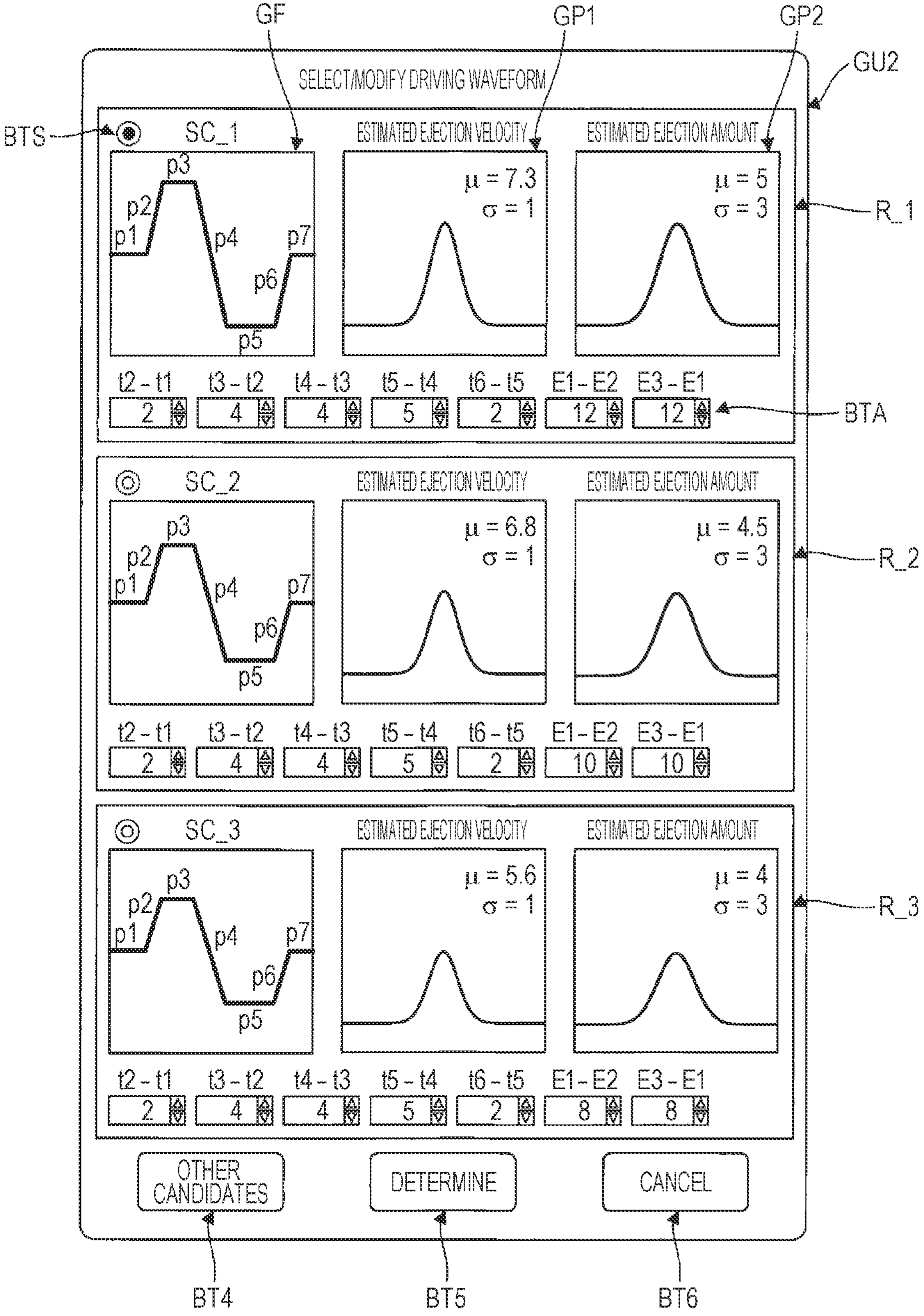
FIG. 5 illustrates an example of a display image for indicating waveform candidates and estimated ejection characteristics.

FIG. 5 illustrates an example of a display image used in steps S150 and S160 described above. When the waveform candidates SC_1, SC_2, and SC_3 are determined in step S140, for example, an image GU2 for the GUI illustrated in FIG. 5 is displayed on the display device 410.

The image GU2 includes the candidate information R_1, R_2, and R_3 and buttons BT4, BT5, and BT6. The candidate information R_1, the candidate information R_2, and the candidate information R_3 indicate information of different waveform candidates.

Specifically, the candidate information R_1 is information of the waveform candidate SC_1. Of the candidate information R_1, R_2, and R_3, mainly the candidate information R_1 will be described below. Note that, since the candidate information R_2 and the candidate information R_3 are similar to the candidate information R_1 except that the waveform candidates SC_2 and SC_3 that differ from the waveform candidate SC_1 are used, description thereof will be appropriately omitted.

In the example illustrated in FIG. 5, the candidate information R_1 includes information GF, estimation information GP1 and GP2, a box group BTA, and a button BTS.

The information GF is information indicating a shape of the waveform candidate SC_1 according to the initial waveform described above. The information GF of the present embodiment indicates the shape of the waveform candidate SC_1 by using a graph on which the vertical axis denotes voltage and the horizontal axis denotes time. Note that the shapes of the waveform candidates SC_1, SC_2, and SC_3 illustrated in FIG. 5 are examples and are not limited thereto. Although the information indicating the shape of the waveform candidate SC_1 is used here as the information GF such that the time and the voltage of the waveform candidate SC_1 are able to be viewed by the user, information directly indicating a time value and a voltage value of the waveform candidate SC_1 by using, for example, numerical values may be used as the information GF.

Each of the estimation information GP1 and the estimation information GP2 is information indicating an estimation value of the ejection characteristics of the ink ejected from the liquid ejecting head 210 when the waveform candidate SC_1 is used for the driving pulse PD. Specifically, the estimation information GP1 indicates an estimation value of the ejection velocity of the ink. The estimation information GP2 indicates an estimation value of the ejection amount of the ink. Each piece of information of the present embodiment indicates the estimation value in accordance with a probability distribution by using a graph on which the vertical axis denotes probability density and the horizontal axis denotes an estimation value and by using characters indicating an average and a dispersion of the probability distribution by using numerical values. Note that the probability distribution illustrated in FIG. 5 is an example and is not limited thereto. Here, although a case in which each of the estimation information GP1 and the estimation information GP2 is indicated by the graph on which the horizontal axis denotes the estimation value and the vertical axis denotes the probability density has been described, each of the estimation information GP1 and the estimation information GP2 may be indicated by a graph on which the probability density is indicated by changing a color or concentration for each estimation value, or the probability density may be indicated by a numerical value for each estimation value. Furthermore, it is possible that numerical value other than the average and the dispersion is shown in estimation information GP1 and GP2. For example, standard deviation can be used as numerical value in estimation information GP1 and GP2.

The estimation information GP1 and the estimation information GP2 are generated by performing statistical processing such as Gaussian process regression in accordance with posterior distribution of the ejection characteristics of the ink ejected from the liquid ejecting head 210 and in accordance with the aforementioned evaluation function (waveform). The information may be generated by using, in addition to the waveform and the ejection characteristics, data of the type of the liquid ejecting head 210, the type of the ink, environmental temperature, or the like. Such data is stored appropriately in the storage circuit 430 as the waveform history information D2 at, for example, the measurement time described above.

Here, when data needed for statistical processing for generating the estimation information GP1 and GP2 is insufficient, a simulation is performed instead of or in combination with the statistical processing to generate the estimation information GP1 and GP2. Thus, even when data needed for the statistical processing is insufficient, it is possible to enhance accuracy of the estimation value compared with a case in which information is generated by performing only the statistical processing.

The box group BTA is a widget group for an adjustment instruction for adjusting the waveforms of the waveform candidates SC_1, SC_2, and SC_3. In the example illustrated in FIG. 5, the box group BTA is constituted by a plurality of combo boxes with which a time value t2−t1, a time value t3−t2, a time value t4−t3, a time value t5−t4, a time value t6−t5, a voltage value E1-E2, and a voltage value E3-E1 are able to be input. In response to an input to the box group BTA, the waveform candidates SC_1, SC_2, and SC_3 are determined again. Upon determining the waveform candidates again, content of the information GF described above is updated, and the statistical processing or simulation described above is performed again, thereby updating also content of the estimation information GP1 and GP2.

The button BTS is a button of a selection instruction for selecting at least one piece of candidate information from the plurality of pieces of candidate information R_1, R_2, and R_3. In the example illustrated in FIG. 5, the button BTS is a radio button provided for each piece of candidate information R_1, R_2, and R_3.

The button BT4 is a button for performing a fifth step of determining the waveform candidates SC_1, SC_2, and SC_3 again. When the button BT4 is operated, it is determined that no waveform is selected in step S170, and processing of proceeding to step S180 is performed. Here, in a case of a determination instruction indicating whether or not to determine the driving pulse PD waveform, the instruction issued by operating the button BT4 means that the driving pulse PD waveform is not determined.

The button BT5 is a button for determining the driving pulse PD waveform. When the button BT5 is operated, it is determined that the waveform is selected in step S170, processing of proceeding to step S190 is performed, and one of the waveform candidates SC_1, SC_2, and SC_3 or one of the waveform candidates SC_1, SC_2, and SC_3 that are modified by the user is determined as the driving pulse PD waveform. At this time, for example, one waveform candidate selected with the button BTS is determined as the driving pulse PD waveform. Here, in the case of the determination instruction indicating whether or not to determine the driving pulse PD waveform, the instruction issued by operating the button BT5 means that the driving pulse PD waveform is determined.

The button BT6 is a button for cancelling the driving waveform determining mode. Operating the button BT6 ends display of the image GU2 and cancels the driving waveform determining mode.

As described above, the driving waveform determining system 100 includes the liquid ejecting head 210 and the processing circuit 270. As described above, the liquid ejecting head 210 includes the piezoelectric element 211, which is an example of the driving element for ejecting the ink which is an example of the liquid. The processing circuit 270 performs processing of determining the waveform of the driving pulse PD applied to the piezoelectric element 211.

As described above, the processing circuit 270 performs the first step of determining the waveform candidates SC_1, SC_2, and SC_3 of the driving pulse PD, the second step of notifying the user of the candidate information R_1, R_2, and R_3 of the waveform candidates SC_1, SC_2, and SC_3, the third step of receiving an instruction issued by the user in accordance with the candidate information R_1, R_2, and R_3, and the fourth step of determining the driving pulse PD waveform in accordance with the instruction. In this manner, the processing circuit 270 performs the driving waveform determining method including the first step, the second step, the third step, and the fourth step.

The driving waveform determining system 100 described above is able to determine the driving pulse PD waveform by using the waveform candidates SC_1, SC_2, and SC_3 that are automatically determined. Thus, it is possible to reduce a burden on the user compared with a case of manually determining the driving pulse PD waveform. Here, after notifying the user of the candidate information R_1, R_2, and R_3 of the waveform candidates SC_1, SC_2, and SC_3, the driving pulse PD waveform is determined upon the instruction from the user, thus making it possible to determine the driving pulse PD based on the knowledge of the user. Accordingly, compared with a case of completely automatically determining the driving pulse PD waveform, it is possible to reduce time required to determine the driving pulse PD waveform and also possible to reduce the amount of the ink consumed in actual measurement.

In the present embodiment, as described above, notification to the user in the second step is performed by displaying the candidate information R_1, R_2, and R_3 on the display device 410, which is an example of the display section. Thus, it is possible to visually notify the user of the candidate information R_1, R_2, and R_3. As a result, there is an advantage in that the user easily identifies the candidate information R_1, R_2, and R_3 compared with a case of notifying the candidate information R_1, R_2, and R_3 by using a method other than visual notification. Note that notification of the candidate information R_1, the candidate information R_2, and the candidate information R_3 to the user is not limited to being performed by performing display and may be performed by using sound or the like.

Moreover, as described above, the candidate information R_1, the candidate information R_2, and the candidate information R_3 include the information GF of the shapes of the waveform candidates SC_1, SC_2, and SC_3. Thus, there is an advantage in that the user easily instinctively identifies the waveform candidates SC_1, SC_2, and SC_3. Note that, in the present embodiment, the user is notified of each of the shapes of the waveform candidates SC_1, SC_2, and SC_3 by performing display with the graph on which the vertical axis denotes the voltage and the horizontal axis denotes the time, but a notification is not limited thereto and may be performed by, for example, displaying characters such as a name indicating each of the shapes.

Moreover, as described above, the candidate information R_1, the candidate information R_2, and the candidate information R_3 include the information GF of the time values and the voltage values of the waveform candidates SC_1, SC_2, and SC_3. Thus, there is an advantage in that the user easily identifies details of the waveform candidates SC_1, SC_2, and SC_3. Note that, in the present embodiment, the user is notified of each of the time values and the voltage values of the waveform candidates SC_1, SC_2, and SC_3 by performing display with the graph on which the vertical axis denotes the voltage and the horizontal axis denotes the time, but a notification is not limited thereto and may be performed by, for example, displaying characters such as numerical values indicating each of the time values and each of the voltage values.

Further, as described above, each of the candidate information R_1, the candidate information R_2, and the candidate information R_3 includes the estimation information GP1 and GP2 indicating estimation values of the ejection characteristics of the ink ejected from the liquid ejecting head 210 when each of the waveform candidates SC_1, SC_2, and SC_3 is used for the driving pulse PD. Thus, when the user issues an instruction, for example, for determining or adjusting the driving pulse PD waveform by using the estimation information GP1 and GP2, it is possible to enhance a probability of the instruction compared with a case of using neither the estimation information GP1 nor GP2.

The estimation value of each of the estimation information GP1 and the estimation information GP2 is indicated by a probability distribution. Thus, when the user issues an instruction, for example, for determining or adjusting the driving pulse PD waveform by using the probability distribution, the user easily performs determination regarding the instruction compared with a case of using no such a probability distribution. In the present embodiment, the probability distribution indicates an average or dispersion of the estimation values. Note that, in the present embodiment, the user is notified of the probability distribution by performing display that uses the graph on which the vertical axis denotes the probability density and the horizontal axis denotes the estimation value and that uses characters indicating the average or dispersion of the probability distribution with numerical values, but any one of the graph and the characters may be omitted.

The waveform candidates SC_1, SC_2, and SC_3 are each a waveform candidate of the driving pulse PD. That is, the waveform candidates SC_1, SC_2, and SC_3 include a plurality of waveform candidates of the driving pulse PD. In the second step, the user is notified of the plurality of pieces of candidate information R_1, R_2, and R_3 corresponding to the plurality of waveform candidates SC_1, SC_2, and SC_3.

In the present embodiment, as described above, the user is able to select at least one piece of candidate information from the plurality of pieces of candidate information R_1, R_2, and R_3, and the instruction of such selection is an example of the selection instruction in the third step. That is, the instruction in the third step includes the selection instruction for selecting at least one piece of candidate information from the plurality of pieces of candidate information R_1, R_2, and R_3. Thus, it is possible to reduce a burden on the user when the instruction is issued in the third step compared with a case in which the number of waveform candidates of the driving pulse PD is one. Note that the plurality of waveform candidates SC_1, SC_2, and SC_3 are simultaneously notified in the present embodiment, but a notification is not limited thereto, and the waveform candidates SC_1, SC_2, and SC_3 may be sequentially notified one by one in accordance with, for example, the instruction from the user.

As described above, the user is able to adjust the waveform candidates SC_1, SC_2, and SC_3, and the instruction of such adjustment is an example of the adjustment instruction in the third step. That is, the instruction in the third step includes the adjustment instruction for adjusting the waveform candidates SC_1, SC_2, and SC_3. Thus, even when the notified waveform candidate is not optimum, it is possible to optimize the waveform candidate in accordance with the adjustment instruction from the user. When the user has knowledge regarding the driving pulse PD waveform, it is possible to adjust the waveform candidates SC_1, SC_2, and SC_3 based on the knowledge.

As described above, after the plurality of pieces of candidate information R_1, R_2, and R_3 are notified, the user is able to issue an instruction about whether or not to determine the driving pulse PD waveform, and the instruction is an example of the determination instruction in the third step. That is, the instruction in the third step includes the determination instruction indicating whether or not to determine the driving pulse PD waveform. When the determination instruction indicates that the driving pulse waveform is determined, the fourth step is performed. That is, in such an instance, the driving pulse PD waveform is determined. On the other hand, when the determination instruction indicates that the driving pulse PD waveform is not determined, the fifth step of determining the waveform candidates SC_1, SC_2, and SC_3 again is performed. Thus, even when neither waveform candidates SC_1, SC_2, nor SC_3 is optimum, it is possible to optimize the waveform candidates SC_1, SC_2, and SC_3 in accordance with the determination instruction from the user. Moreover, there is an advantage in that, when the user has knowledge regarding the driving pulse PD waveform, the user easily performs determination based on the knowledge.

In the present embodiment, in the fifth step described above, the waveform candidates SC_1, SC_2, and SC_3 are determined again in accordance with the instruction from the user in the third step. Thus, it is possible to reduce the number of unnecessary waveform candidates included in the waveform candidates determined again. As a result, even when waveform candidates that are notified first are not optimum, it is possible to efficiently determine the driving pulse waveform. Note that, determining a waveform candidate again is not limited to being performed in accordance with the instruction from the user and may be performed, for example, every preset time.

Further, in the fifth step described above, the waveform candidates SC_1, SC_2, and SC_3 are desirably changed. In such an instance, it is possible to suppress the waveform candidates SC_1, SC_2, and SC_3 that are determined again from including an unnecessary waveform candidate.

As described above, the waveform candidates SC_1, SC_2, and SC_3 are determined by performing a simulation. That is, in the first step described above, the waveform candidates SC_1, SC_2, and SC_3 are determined by performing a simulation. Thus, it is possible to reduce the number of times of ejecting the ink to determine the waveform candidates SC_1, SC_2, and SC_3 compared with a case of performing no simulation.

As described above, the waveform candidates SC_1, SC_2, and SC_3 are determined by statistically using information of the ejection characteristics of the ink ejected from the liquid ejecting head 210 as necessary. That is, in the first step described above, the waveform candidates SC_1, SC_2, and SC_3 are determined by statistically using information of the ejection characteristics of the ink ejected from the liquid ejecting head 210. Thus, it is possible to reduce the number of times of actually ejecting the ink compared with a case of using no such information. Further, by using the past measurement result or the like as the information, it is possible to determine the driving pulse PD waveform based on the knowledge of the user.

Moreover, as described above, the processing circuit 270 performs, in addition to the respective steps described above, a sixth step of measuring the ejection characteristics of the ink ejected from the liquid ejecting head 210 when the driving pulse PD that uses the waveform candidates SC_1, SC_2, or SC_3 as the waveform is actually applied to the piezoelectric element 211. In the second step described above, the waveform candidates SC_1, SC_2, and SC_3 are generated by using the result obtained in the sixth step, that is, the result obtained by measuring the ejection characteristics. Thus, it is possible to enhance a probability of the waveform candidates SC_1, SC_2, and SC_3 with respect to a desired waveform compared with a case of performing no such measurement.

2. Second Embodiment

Figure 7:
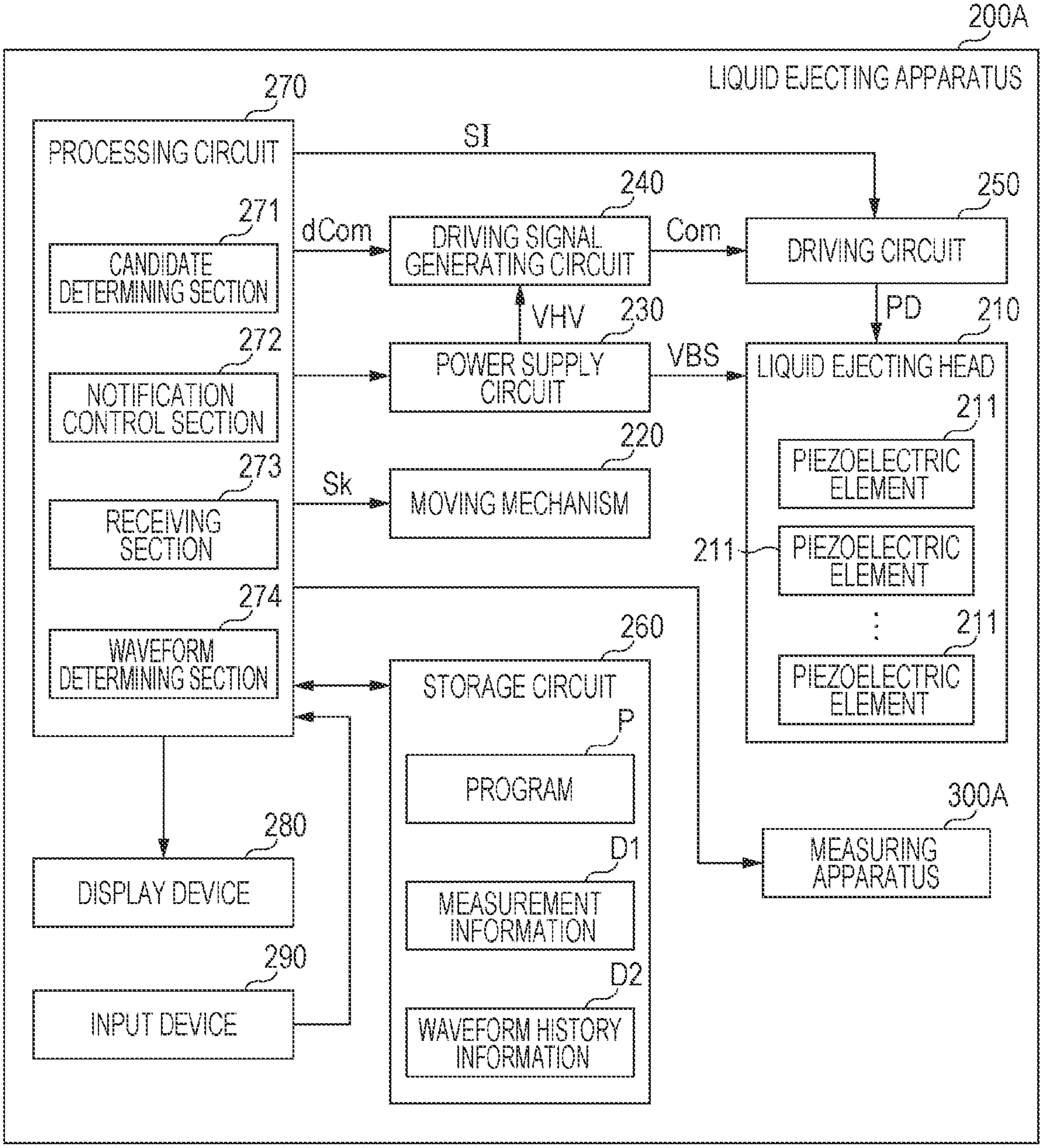
FIG. 7 is a schematic view illustrating an example of a configuration of a liquid ejecting apparatus according to a second embodiment.

FIG. 7 is a schematic view illustrating an example of a configuration of a liquid ejecting apparatus 200A according to a second embodiment. The liquid ejecting apparatus 200A is similar to the liquid ejecting apparatus 200 described above except that the liquid ejecting apparatus 200A includes a display device 280, an input device 290, and a measuring apparatus 300A and executes the program P.

The display device 280 is similar in configuration to the display device 410 of the first embodiment described above. The input device 290 is similar in configuration to the input device 420 of the first embodiment described above. The measuring apparatus 300A is similar in configuration to the measuring apparatus 300 of the first embodiment described above. Note that at least one of the display device 280, the input device 290, and the measuring apparatus 300A may be provided outside the liquid ejecting apparatus 200A.

The program P, the measurement information D1, and the waveform history information D2 are stored in the storage circuit 260 of the present embodiment. The processing circuit 270 of the present embodiment is an example of the computer and functions as a candidate determining section 271, a notification control section 272, a receiving section 273, and a waveform determining section 274 by executing the program P.

Similarly to the candidate determining section 441 of the first embodiment described above, the candidate determining section 271 determines a waveform candidate of the driving pulse PD. Similarly to the notification control section 442 of the first embodiment described above, the notification control section 272 notifies the user of candidate information. Similarly to the receiving section 443 of the first embodiment described above, the receiving section 273 receives an instruction from the user via the aforementioned input device 290 or the like. Similarly to the waveform determining section 444 of the first embodiment described above, the waveform determining section 274 determines the driving pulse PD waveform in accordance with the instruction. As described above, similarly to the processing circuit 440 of the first embodiment described above, the processing circuit 270 performs the first step, the second step, the third step, and the fourth step.

Similarly to the first embodiment described above, also in the foregoing second embodiment, it is possible to determine the driving pulse PD waveform while reducing a burden of time and cost on the user.

3. Third Embodiment

Figure 8:
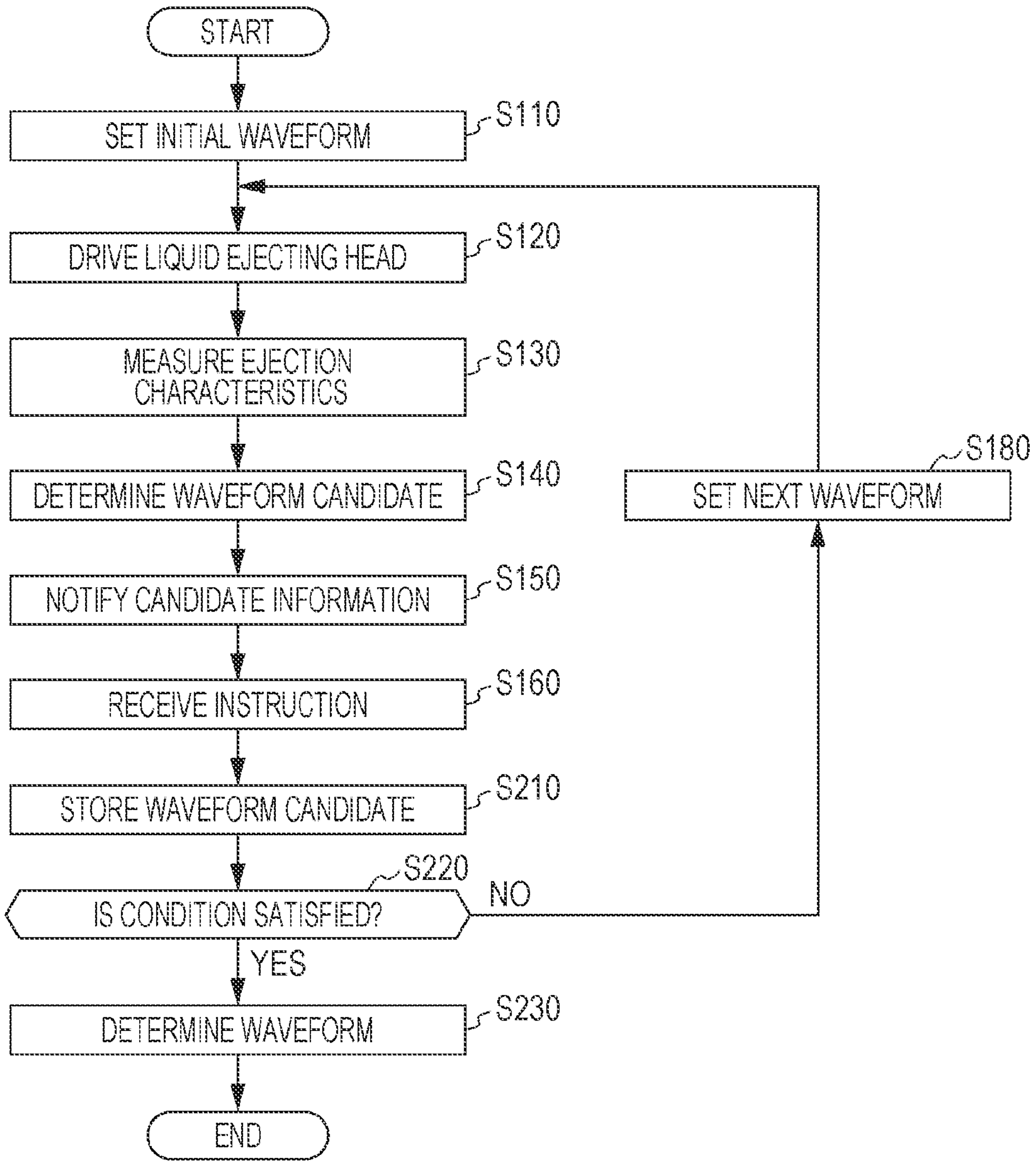
FIG. 8 is a flowchart of a driving waveform determining method according to a third embodiment.

FIG. 8 is a flowchart of a driving waveform determining method according to a third embodiment.

Here, since steps S110 to S160 in the third embodiment are similar to steps S110 to S160 in the first embodiment, description thereof will be omitted.

In the third embodiment, after receiving the instruction from the user for selecting or modifying the waveform candidate SC_1 via the input device 290 in step S160, the procedure proceeds to step S210.

In step S210, the information GF, information indicating whether or not the user selects the waveform candidate SC_1 indicated by the information GF, information indicating whether or not the user modifies the waveform candidate SC_1 indicated by the information GF, and information of, when the user modifies the waveform candidate SC_1, a degree of the modification are stored in the storage circuit 430. Note that the pieces of information are not limited to being stored in the storage circuit 430 and may be stored in, for example, an external storage server that is provided separately from the liquid ejecting apparatus 200 or the information processing apparatus 400.

Next, in step S220, whether or not a predetermined condition is satisfied is determined. Here, the predetermined condition is a condition for determining whether or not the waveform candidate SC_1 indicated by the information GF selected by the user from pieces of information GF stored in the storage circuit 430 or the like becomes close to an ideal waveform. When the information GF selected by the user accumulates in the storage circuit 430 or the like multiple times as described later and no change is thus generated in waveform candidates SC_1 indicated by the pieces of information GF, the waveform candidate SC_1 is considered to be close to an ideal waveform, and it is possible to determine that the predetermined condition is satisfied. In addition, when the number of pieces of information GF selected by the user from the pieces of information GF stored in the storage circuit 430 or the like exceeds the predetermined number, the number of times of searching for the driving pulse PD is considered to be sufficient, and it may be determined that the predetermined condition is satisfied.

When it is determined that the predetermined condition is not satisfied in step S220, the procedure proceeds to step S180. Since step S180 of the third embodiment is similar to step S180 of the first embodiment, description thereof will be omitted.

When it is determined that the predetermined condition is satisfied in step S220, the procedure proceeds to step S230. In step S230, the driving pulse PD waveform is determined in accordance with the information GF selected by the user from the ones stored in the storage circuit 430 or the like. An average of waveform candidates SC_1 indicated by pieces of information GF selected by the user may be determined as the driving pulse PD waveform, or the waveform candidate SC_1 indicated by the information GF that is finally stored may be determined as the driving pulse PD waveform.

4. Modified Example

The driving waveform determining method, the non-transitory computer-readable storage medium storing the driving waveform determining program, the liquid ejecting apparatus, and the driving waveform determining system according to the disclosure have been described above based on the illustrated embodiments. However, the disclosure is not limited thereto. Additionally, the configuration of each of the sections of the disclosure may be replaced with any configuration that exerts a similar function of the aforementioned embodiments, and any configuration may be added thereto.

4-1. Modified Example 1

The configuration in which the program P is executed by the processing circuit provided in the same apparatus as the storage circuit in which the program P is installed is exemplified in the aforementioned embodiments, but the configuration is not limited thereto, and the program P may be executed by a processing circuit provided in an apparatus different from the storage circuit in which the program P is installed. For example, as in the first embodiment, the program P stored in the storage circuit 430 of the information processing apparatus 400 may be executed by the processing circuit 270 of the liquid ejecting apparatus 200.

4-2. Modified Example 2

The configuration in which the information GF, the estimation information GP1 and GP2, the box group BTA, and the button BTS are displayed as the image GU2 is disclosed in the aforementioned embodiments, but the configuration is not limited thereto. For example, the configuration may be such that only the information GF, the box group BTA, and the button BTS are displayed as the image GU2, and after a selection instruction or an adjustment instruction to the image is issued, an image including the estimation information GP1 and GP2 is displayed. In such an instance, the image including the estimation information GP1 and GP2 may include no information GF. Further, the configuration may be such that only the information GF and the button BTS are displayed as the image GU2 and that only a selection instruction to the information GF is able to be received. Moreover, no information GF may be displayed as the image GU2. For example, the configuration may be such that only the estimation information GP1 and GP2 and the button BTS are displayed as the image GU2 and that a selection instruction to the estimation information GP1 and GP2 is received.

What is claimed is:

1. A driving waveform determining method with which a waveform of a driving pulse applied to a driving element provided in a liquid ejecting head that ejects a liquid to a recording medium is determined, the driving waveform determining method comprising:

a first step of measuring ejection characteristics of the liquid;

a second step of determining a waveform candidate of the driving pulse for ejecting the liquid to the recording medium on a basis of measured ejection characteristics;

a third step of notifying a user of candidate information of the waveform candidate;

a fourth step of receiving an instruction issued by the user in accordance with the candidate information; and a fifth step of determining the waveform of the driving pulse for ejecting the liquid to the recording medium in accordance with the instruction, wherein the candidate information includes estimation information indicating an estimation value of ejection characteristics of the liquid ejected from the liquid ejecting head when the waveform candidate is used for the driving pulse.

2. The driving waveform determining method according to claim 1, wherein the candidate information includes information of a shape of the waveform candidate.

3. The driving waveform determining method according to claim 1, wherein the candidate information includes information of a time value and a voltage value of the waveform candidate.

4. The driving waveform determining method according to claim 1, wherein the estimation information indicates the estimation value by using a probability distribution.

5. The driving waveform determining method according to claim 4, wherein the probability distribution indicates an average or dispersion of estimation values.

6. The driving waveform determining method according to claim 1, wherein the waveform candidate includes a plurality of waveform candidates of the driving pulse, in the third step, the user is notified of a plurality of pieces of candidate information corresponding to the plurality of waveform candidates, and the instruction includes a selection instruction for selecting at least one piece of candidate information from the plurality of pieces of candidate information.

7. The driving waveform determining method according to claim 1, wherein the instruction includes an adjustment instruction for adjusting the waveform candidate.

8. The driving waveform determining method according to claim 1, wherein the instruction includes a determination instruction indicating whether or not to determine the waveform of the driving pulse, when the determination instruction indicates that the waveform of the driving pulse is determined, the fifth step is performed, and when the determination instruction indicates that the waveform of the driving pulse is not determined, a sixth step of determining the waveform candidate again is performed.

9. The driving waveform determining method according to claim 8, wherein in the sixth step, the waveform candidate is determined again in accordance with the instruction.

10. The driving waveform determining method according to claim 8, wherein in the sixth step, the waveform candidate is changed.

11. The driving waveform determining method according to claim 1, wherein in the third step, notifying the user is performed by displaying the candidate information on a display section.

12. The driving waveform determining method according to claim 1, wherein in the second step, the waveform candidate is determined by performing a simulation.

13. The driving waveform determining method according to claim 1, wherein the candidate information of the waveform candidate includes information of a shape of the waveform candidate and a graphical representation of the estimation value of the ejection characteristics of the liquid ejected from the liquid ejecting head when the waveform candidate is used for the driving pulse, the estimation value being illustrated using a probability distribution.

14. The driving waveform determining method according to claim 1, wherein a plurality of adjustment controls are associated with the waveform candidate and allow a user to adjust a shape of the waveform candidate for each of a plurality of discrete times and a plurality of voltage values, and wherein an instruction issued by the user in the third step comprises changes to the plurality of adjustment controls to adjust the shape of the waveform candidate.

15. A non-transitory computer-readable storage medium storing a driving waveform determining program, the driving waveform determining program causing a computer to execute the driving waveform determining method according to claim 1.

16. A liquid ejecting apparatus comprising:

a liquid ejecting head that has a driving element for ejecting a liquid to a recording medium; and a processing circuit that performs processing of determining a waveform of a driving pulse for ejecting the liquid to the recording medium applied to the driving element, wherein the processing circuit performs:

a first step of measuring ejection characteristics of the liquid;

a second step of determining a waveform candidate of the driving pulse for ejecting the liquid to the recording medium on a basis of measured ejection characteristics;

a third step of notifying a user of candidate information of the waveform candidate;

a fourth step of receiving an instruction issued by the user in accordance with the candidate information; and a fifth step of determining the waveform of the driving pulse for ejecting the liquid to the recording medium in accordance with the instruction, wherein the candidate information includes estimation information indicating an estimation value of ejection characteristics of the liquid ejected from the liquid ejecting head when the waveform candidate is used for the driving pulse.

17. A driving waveform determining system comprising:

A liquid ejecting head that has a driving element for ejecting a liquid to a recording medium; and a processing circuit that performs processing of determining a waveform of a driving pulse for ejecting the liquid to the recording medium applied to the driving element, wherein the processing circuit performs:

a first step of measuring ejection characteristics of the liquid;

a second step of determining a waveform candidate of the driving pulse for ejecting the liquid to the recording medium on a basis of measured ejection characteristics;

a third step of notifying a user of candidate information of the waveform candidate;

a fourth step of receiving an instruction issued by the user in accordance with the candidate information; and a fifth step of determining the waveform of the driving pulse for ejecting the liquid to the recording medium in accordance with the instruction, wherein the candidate information includes estimation information indicating an estimation value of ejection characteristics of the liquid ejected from the liquid ejecting head when the waveform candidate is used for the driving pulse.

* * * * *